May 28, 1968   N. B. PERKINS   3,385,049
TIMING DEVICE FOR ENGINES AND THE LIKE
Filed Nov. 23, 1965   2 Sheets-Sheet 2
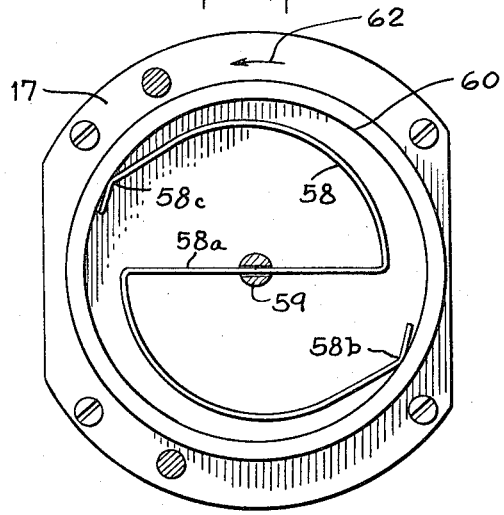
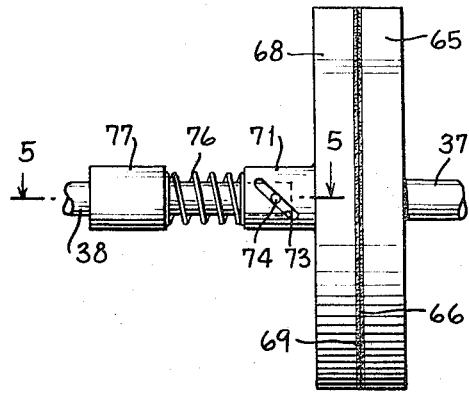
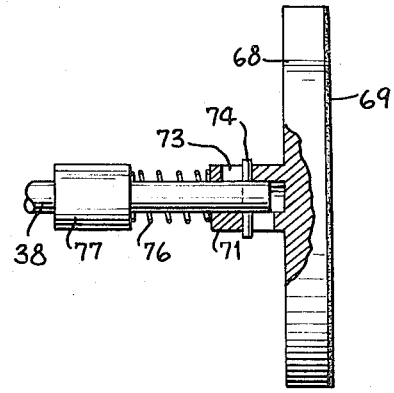
INVENTOR.
NEWTON B. PERKINS
BY
Robert S. Dunham
ATTORNEY

# United States Patent Office 3,385,049
Patented May 28, 1968

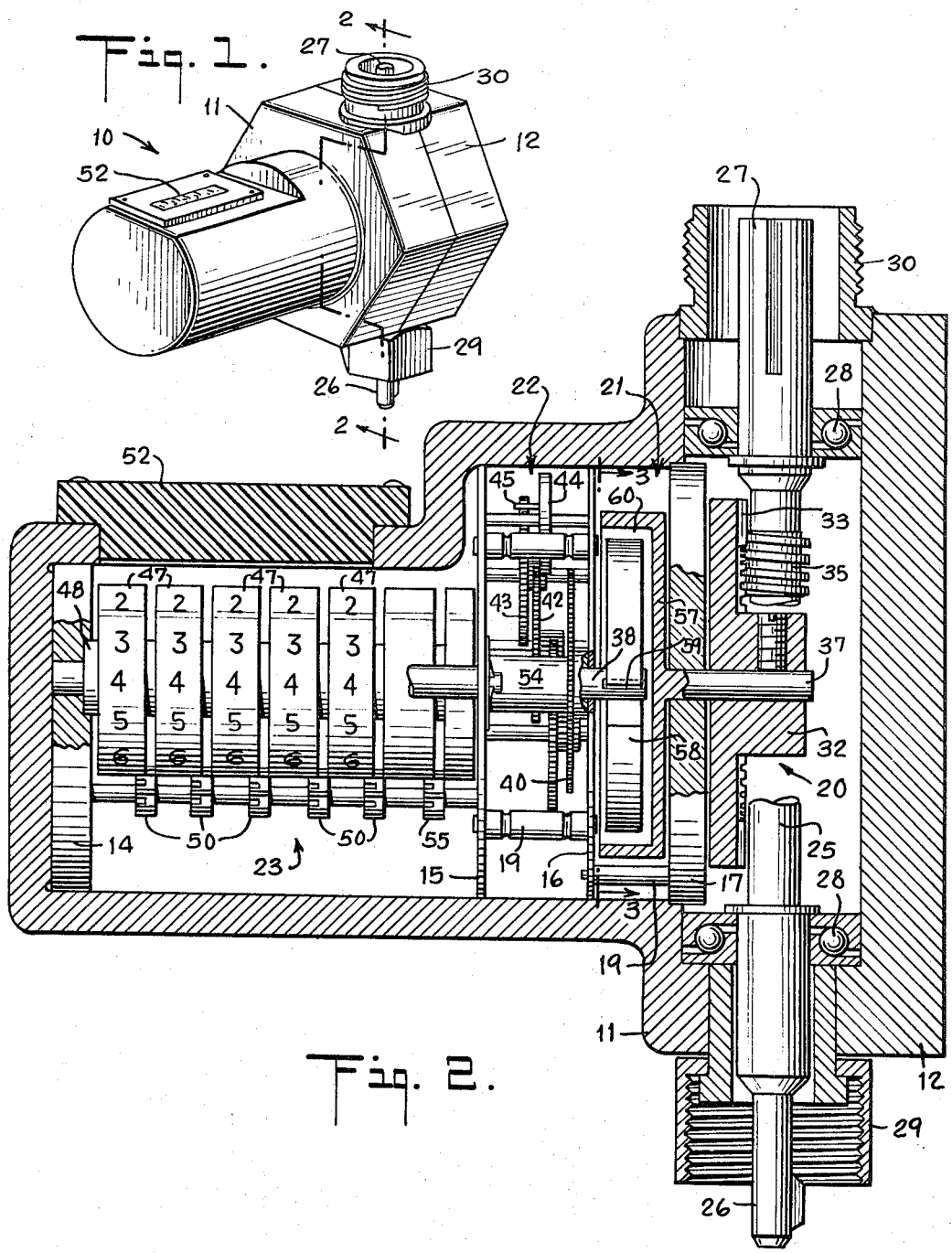

3,385,049
TIMING DEVICE FOR ENGINES
AND THE LIKE
Newton B. Perkins, Ridgefield, Conn., assignor to Twen Inc., Danbury, Conn., a corporation of Connecticut
Filed Nov. 23, 1965, Ser. No. 509,280
1 Claim. (Cl. 58—145)

ABSTRACT OF THE DISCLOSURE

A device for indicating total operating time of a diesel engine or the like, including an elapsed-time-indicating counter mechanism driven by a shaft which is limited to a constant rate of rotation by an escapement, and a slipping frictional assembly for transmitting torque to the counter shaft from the take-off shaft of a diesel engine. In one form, the slipping frictional assembly comprises a cup rotated by the take-off shaft through reduction gearing, and an S-shaped spring connected to the counter shaft and having its ends in slipping frictional contact with the inner wall of the cup. In another form the assembly comprises a first disk rotated by the take-off shaft through reduction gearing and a second disk connected to the counter shaft and in frictional contact with the first disk; the second disk is axially movable relative to the counter shaft and tends to undergo axial movement away from the first disk as the first disk rotates but is spring biased against such axial movement.

---

This invention relates to timing devices, and more particularly to devices for measuring or indicating the time of operation of engines and the like.

One important specific application of the present device is in measuring the total or cumulative elapsed time of operation of industrial or other stationary (i.e. nonvehicular) diesel engines. Accurate indication of the cumulative operating time of such an engine is desirable as an aid in determining when engine servicing or maintenance is necessary, and is also important for a variety of other purposes, e.g. as to measure the warranty period of engines warranted by the manufacturer for a specified duration of service, or, in the case of rented equipment where the rental is based on hours of service, to measure the rental payment due.

In at least many instances, direct measurement or counting of the number of engine shaft revolutions does not provide an indication of elapsed running time sufficiently accurate for the foregoing and other purposes, since the speed of the engine shaft is ordinarily subject to substantial variation during operation. For this reason, also, a timing device for use with such engines should be independent of engine speed; but at the same time it should respond to starting and stopping of the engine, i.e. so as to record or indicate only the cumulative duration of actual operating periods.

Conveniently a timing device of the character described may be arranged to be driven by a drive shaft from the engine, and the indication of time of operation may be provided by a counter mechanism to which torque is transferred from the drive shaft in a manner enabling the rate of operation of the counter mechanism to be controlled to a constant value (as by escapement means or the like) regardless of variations in engine speed. For effecting such torque transfer, a first member operating the counter mechanism may be frictionally coupled to a second member rotated by the engine shaft at a rate proportional to the angular velocity of that shaft, the force of friction developed between these two members acting to exert a torque on the first member. However, variations in the frictional forces acting between these relatively movable members, and especially the development of excessive friction between them, may produce undesired irregularities in the operating speed of the counter mechanism; i.e., the excessive frictional force may override the limiting action of the escapement. Thus, although the provision of drive from the engine affords assured response of the timing mechanism to starting and stopping of the engine, and although the use of a frictional coupling constitutes a convenient and effective way of transferring torque between a variable-speed driving element and a fixed-speed driven element, nevertheless the problems occasioned by variations in frictional forces and/or development of excessive friction in such couplings have heretofore hindered attainment of desired accuracy in timing devices constructed on these principles.

An object of the present invention is to provide a new and improved device for measuring the cumulative operating time of a diesel or other engine, which is driven by a drive shaft from the engine, and in which the drive from the engine is transmitted to a rate-limited counter mechanism in a manner affording assured uniformity of rate of counter mechanism operation. Another object is to provide such a device including a torque transfer mechanism wherein variations in friction and development of excessive frictional forces between the driving and driven elements of the mechanism are avoided, to provide indications of engine operating time of desirably improved accuracy even over very long periods of engine operation. A still further object is to provide a torque transfer mechanism, for use in timing devices of the aforementioned character, wherein torque is transmitted between relatively movable members in a manner effectively preventing irregularities in rate of counter operation due to variations in frictional forces between the members, and avoiding the development of excessive friction between them.

To these and other ends, the present invention in exemplary embodiments thereof particularly contemplates the provision of a first rotatable member, operatively connected to means such as an escapement for limiting the rate of rotation of such member, and further connected to actuate a counter mechanism providing indication of the cumulative time of rotation of the first member; a second rotatable member, driven by a drive shaft from the engine with which the device is used; and an element carried by the first member in positive torque-transmitting engagement therewith and having a portion in slipping frictional contact with the second member for transmitting torque between the second member and the first member upon rotation of the second member when the latter is driven by the engine shaft. Further, in accordance with the invention, this last-mentioned element is so constructed and arranged that rotation of the second member tends to displace the element away from contact therewith, but at the same time the element is resiliently biased into maintained contact with the second member. The resilient bias counteracts the "de-clutching" effect of rotation of the second member to an extent sufficient to permit continued transmission of torque from the second member to the element, while the declutching action prevents development of excessive friction between the element and the second member. In this way, the first member is effectively driven by rotation of the second member but there is no tendency to override the escapement indcident to variations in frictional forces between the relatively movable parts of the torque transfer assembly.

Further features and advantages of the invention will be apparent from the detailed description hereinbelow set forth, together with the accompanying drawings, wherein:

FIG. 1 is a perspective view of a timing device incorporating the present invention in a particular form;

FIG. 2 is a sectional view taken along the line 2—2 of FIG. 1;

FIG. 3 is a sectional view taken along the line 3—3 of FIG. 2;

FIG. 4 is a side view of an alternative embodiment of the torque transfer assembly of the invention; and FIG. 5 is a fragmentary sectional view taken as along the line 5—5 of FIG. 4.

Referring first to FIGS. 1 and 2, the device there shown is arranged for measurement of the cumulative operating time of a stationary diesel engine (not shown) having a conventional tachometer takeoff. The timing mechanism of the device is enclosed in a generally cylindrical housing 10, which is sealed to protect the internal mechanism from dust, fluids and the like, and which has an enlarged head portion 11 at one end including a cap portion 12 that is fixed in place after the internal mechanism is positioned in the housing. Within the housing 10, there is disposed an inner frame comprising plates 14, 15, 16 and 17, extending transversely of the axis of the cylindrical housing, and interconnected in spaced parallel relation by a plurality of tie rods 19 to provide a rigid assembly. To prevent angular displacement of this inner frame relative to the housing, the plate 17 (i.e. the plate furthest to the right as seen in FIG. 2) is keyed into the housing wall.

The elements of the timing mechanism are supported by the inner frame, and are conveniently arranged along a common axis coincident with the axis of the housing. Stated generally, these elements comprise a drive assembly 20, a torque transfer assembly 21, an escapement assembly 22 and a counter mechanism 23, arranged from right to left within the frame as seen in FIG. 2.

The drive assembly, enclosed within the enlarged head portion of the housing 10 to the right of the right-hand frame plate 17 (as seen in FIG. 2), includes a pinion shaft 25 extending transversely of the long dimension of the housing in offset relation to the aforementioned housing axis, and having opposite ends 26, 27 shaped to constitute standard SAE input and output tachometer fittings respectively. This shaft 25 is journalled adjacent its ends in sealed bearings 28; the ends of the shaft project beyond the bearings through fittings 29, 30 for connection to structures external to the housing. As will be understood, fitting 29 is adapted to mount the device on a stationary diesel engine, with shaft end 26 engaging the output end of the tachometer take-off shaft of the engine so that the shaft is driven in a given direction, i.e. rotated, from the engine camshaft in the same manner as a conventional tachometer, for example at half-engine speed.

The drive assembly 20 further includes a reducing gear arrangement for transmitting drive from the shaft 25 to the timing mechanism. Although other forms of reducing gearing, such as conventional worm gearing, can be used, a presently preferred arrangement comprises a disk-shaped screw-type gear 32 of the skew axis gear family such as a Helicon gear (this being a known type of reducing gear), bearing on its surface an annular array of gear teeth 33 and disposed to the right of the right-hand frame plate 177 as seen in FIG. 2 for rotation about the aforementioned common axis. Gear 32 cooperates with a pinion 35 (offset with respect to the gear axis), which is carried by shaft 25 and has helically disposed teeth operating with the teeth of gear 32 in known manner to provide appropriate gear coupling in the illustrated offset relation. Desirably the pinion and gear are mutually adapted to provide a high stepdown in rotational speed, for example, a reduction of 60 to 1, between the shaft 25 and gear 32. Thus, for instance, in use with a diesel engine operating at 2,000 r.p.m., shaft 25, being driven at half-engine speed or 1,000 r.p.m. effects rotation of gear 32 at 16⅔ r.p.m.

Gear 32 is supported by a central rod 37, which extends through the frame plate 17 along the aforementioned common axis and is mounted for rotation with gear 32. This rod 37 forms a portion of the torque transfer assembly 21 hereinafter described. Specifically, upon rotation of the rod 37, with gear 32, torque is transmitted by the assembly 21 to a second, independently rotatably-mounted rod or shaft 38 which extends through frame plate 16. The rate of rotation of shaft 38 is limited to an essentially constant, predetermined value, ordinarily much lower than the rate of rotation of shaft 37, by suitable means such as for example an inertia-type escapement assembly 22 mounted between frame plates 15 and 16 an operatively connected to shaft 38. This escapement mechanism may conveniently be of the so-called "clutter" type including a first gear 40 connected to and rotating with shaft 38; a train of gears generally designated 42, driven by gear 40 and providing a high step-up; a toothed wheel 43 driven by the gear train 42; and an inertia wheel 44, pivotally mounted for oscillatory angular displacement and bearing a pair of spaced pallets 45 positioned to alternately engage the teeth of wheel 43 for controlling the rate of rotation of shaft 38. By way of illustration, the escapement may provide a total step-up of e.g. 187:1 between the shaft 38 and wheel 44, and may be arranged to limit rotation of shaft 38 and gear 40 to a rate of one revolution each 6 minutes (i.e. one revolution each ⅒ hour). Escapement mechanisms of this type are well known in the art and accordingly need not be described in detail, it being understood that the mechanism is adapted to effect alternate acceleration and deceleration at a constant rate. Alternate forms of escapement or other means, adapted to restrain or control to an essentially constant value the rate of rotation of a rotatable member driven by a variable torque, may be employed in place of the above-described assembly 22.

The illustrated device also includes a counter mechanism 23 adapted to indicate the cumulative elapsed time of operation of the diesel engine to which the timing device is connected. The counter mechanism may be entirely conventional in character; it may, for example, comprise a plurality of individually rotatable disks 47 disposed in spaced relation on a common spindle 48 between frame plates 14 and 15 and operatively interconnected by means of standard geneva-type transfer gearing indicated at 50 in such manner that one complete revolution of any of the disks 47 effects ⅒ revolution of the disk immediately to its left as seen in FIG. 2. Each of the disks 47 bears numerals 0–9 on its periphery, these being arranged for register with a window 52 in the housing 10 so that the numerals appearing in the window represent the total number of elapsed hours of operation of the engine. The counter is driven by rotation of the escapement gear 40, which is connected by a sleeve 54 to the counter mechanism through appropriate conventional transfer gearing generally indicated at 55; the latter gearing provides a step-down between the rate of rotation of gear 40 and that of the right-hand counter disk 47 such that the latter disk undergoes ⅒ revolution for each hour of rotation (i.e. each ten revolutions) of gear 40.

In combination with the foregoing assemblies, the present invention in the embodiment of FIGS. 2 and 3 particularly includes a torque transfer assembly comprising a cup 57, e.g. of metal (conveniently fabricated of sintered metal to enable impregnation of the cup with lubricant for protection against wear), and a flat sigmoid (i.e. S-shaped) spring 58, fabricated for example of spring steel, carried by shaft 38 and positioned within the cup 57. The cup, disposed on the left-hand side of frame plate 17, has a cylindrical wall that opens toward the escapement assembly 22, and is secured to rod 37 for co-axial rotation therewith. The central portion or cross arm 58a of spring 58 extends through a slotted end 59 of shaft 38 which projects into the interior of cup 57 and in coaxial relation to the latter cup; thus the spring positively engages shaft 38 so that the spring and shaft rotate together and so that torque applied to the spring is transmitted to shaft 38. The opposed free ends 58b, 58c of the spring 58 engage the inner cylindrical wall surface 60 of the cup 57 in slipping frictional contact therewith, the spring being so constructed and dimensioned as to be in a state of continuous compression within the cup.

The unidirectional drive imparted to the pinion shaft 25 by the diesel engine, as transmitted by gear 32, rotates cup 57 in the direction indicated by arrow 62 in FIG. 3, this being the direction in which the free ends 58b and 58c of the spring curve away from the spring cross-arm 58a. Since the escapement assembly 22 limits the rotation of shaft 38 to a rate ordinarily much lower than that of cup 57, the engagement of the latter shaft with the cross-arm of spring 58 restrains the spring against rotation with the cup. Consequently, the rotation of the cup relative to the spring exerts a frictional force on the spring ends that causes winding of the spring until its ends tend to "break away" or become disengaged from the cup wall. However, the spring has a resilient bias (or unwinding tendency) that opposes this declutching tendency, i.e. it forces these ends back into engagement with the cup wall for maintained slipping frictional contact between the spring ends and cup wall surface 60 providing essentially continuous transmission of torque from the cup through the spring to shaft 38 as long as the cup rotates. This applied torque causes the shaft 38 to rotate, at the essentially constant limited rate determined by escapement mechanism 22, driving the counter mechanism 23.

It will be appreciated that with this arrangement of elements, torque is transmitted from cup 57 to shaft 38 by winding of the spring 58, rather than by simple frictional contact between relatively movable parts. In this way, the effects of variation in frictional forces and especially development of excessive friction are avoided, i.e. there is essentially complete freedom from irregularity in operation of the counter mechanism due to varying or excessive friction, and correspondingly enhanced accuracy in elapsed-time indication.

Conveniently, the spring 58 may be so calibrated as to break away from the cup wall upon application of torque of about 8 inch-ounces, it being found in ordinary operation of a timing device having the above-mentioned exemplary arrangement of elements the applied torque may vary over a range of between about 6 inch-ounces and about 10 inch-ounces. With use of this spring, a very high degree of maintained accuracy in time measurement is achieved over greatly extended periods of engine operation.

Other forms and configurations of springs may be employed in place of the sigmoid spring 58 illustrated in FIGS. 2 and 3. For example, a flat coil spring may be used, having its inner end in positive engagement with the slotted end 59 of shaft 38 and its outer end in slipping frictional contact with the cup wall surface 60. However, an advantage of the sigmoid spring is that it becomes fully wound very quickly upon start-up of engine operation, and unwinds with great rapidity at the end of such operation, providing desirably quick response of the counter mechanism to initiation and cessation of engine operation. In a typical example of the illustrated structure, the spring becomes fully wound to the break-away point within about five to 10 seconds of start-up, and becomes fully unwound within about 15 to 25 seconds after the engine is stopped.

The operation of the illustrated timing device will now be readily apparent. When the engine to which the device is connected begins to operate, gear 33 is rotated by means of pinion 35 to cause revolution of rod 37 at a rate proportional to the rate of rotation of the engine shaft. Cup 57 then rotates at the same rate, imparting a continuous torque (through spring 58) to shaft 38 and thereby effecting rotation of the latter shaft. The rate of rotation of the shaft 38 is, as stated, limited to a predetermined essentially constant value by the escapement 22 and hence the counter mechanism 23, driven by shaft 38, is operated at an essentially constant rate. The counter mechanism, as will be understood, indicates the number of revolutions of shaft 38—or in other words, the duration of engine operation, since shaft 38 rotates at constant speed during such operation. This operation continues for as long as the engine is running; when the engine stops, drive of the counter mechanism ceases promptly leaving the counter disks halted at a position indicating the total elapsed time of engine operation. Thereafter, upon restarting of the engine, the counter mechanism is driven again to measure further hours of operation in a cumulative manner.

While the spring and cup arrangement illustrated in FIGS. 2 and 3 constitutes an especially simple, effective and convenient torque transfer assembly, various modified forms of such assembly may be provided within the scope of the invention. For example, as shown in FIG. 4, rod 37 may terminate in a flat clutch disk 65 bearing on its outer (i.e. left-hand) surface a coating of suitable frictional material 66. A second clutch disk 68, likewise having a frictional surface 69, is disposed so that the latter surface engages the surface 66 of disk 65. A sleeve 71 is secured to disk 68 and fits loosely over the end of shaft 38, which in this embodiment is not slotted. Sleeve 71 bears a diagonal or spiral slot 73 through which projects a pin 74 secured to the shaft 38 adjacent the right-hand end thereof. Conveniently the sleeve 71 may bear a pair of oppositely-directed slots 73 on opposed sides, and the pin 74 may extend entirely through shaft 38 and through both of these slots, as particularly indicated in FIG. 5. A helical spring 76 surrounds shaft 38 with its opposite ends respectively engaging the left-hand end of sleeve 71 and the right-hand extremity of an enlarged boss 77 secured to shaft 38. As will be seen, spring 76, which is under compression between the sleeve and boss, continuously urges disk 68 into engagement with disk 65.

In this embodiment, rotation of disk 65 (when shaft 37 is driven, by assembly 20, from the engine shaft) exerts a frictional torque on disk 68. Since the rate of rotation of the shaft 38 is limited by the escapement 22, pin 74 restrains disk 68 against rotation with disk 65; however, slots 73 enable limited angular and axially directed movement of disk 68 relative to shaft 38 and pin 74. The orientation of the slot or slots 73 on sleeve 71 is such that this movement, occurring because of the torque applied to disk 68, would cause the latter disk to "declutch" or move away from engagement with disk 65; i.e. the applied torque tends to cause slot 73 to ride on pin 74 (in a manner analogous to turning of a screw-threaded member) until the pin engages the slot end adjacent the disk, at which point the disk 68 would be spaced away from disk 65. However, the biasing force of spring 76 acting against sleeve 71 opposes the declutching action, urging the disk 68 back into engagement with disk 65 for maintained frictional contact between the disks. In this way, again, torque is transmitted to disk 68, and thence through pin 74 to shaft 38, but the balance of forces provided by the declutching arrangement of the sleeve and pin and the bias of spring 76 prevents variations in friction or development of excessive friction between the two engaging members such as might override the escapement and produce irregularities in counter operation.

It is to be understood that the invention is not limited to the specific features and embodiments hereinabove set forth but may be carried out in other ways without departure from its spirit.

I claim:

1. In a device for measuring the time of operation of an engine having a rotating shaft, in combination, a rotatably mounted rod; a rotatably mounted cup having a cylindrical inner wall opening toward and surrounding one end of said rod, said rod and cup being disposed for rotation about a common axis; a sigmoid spring having a central portion carried by said rod in positive torque-transmitting engagement with said one end of said rod and having opposed free end portions in slipping frictional contact with said inner wall of said cup for transmitting torque from said cup to said spring upon rotation of said cup in a predetermined direction while permitting rotation of said cup relative to said rod; said spring being deformed, between said rod and said inner wall, in a plane parallel to the plane of rotation of said cup, and being so constructed and arranged that rotation of said cup in said predetermined direction tends to increase the deformation of said spring for movement of said free end portions away from contact with said inner wall, said spring further having a resilient bias for urging said free end portions into maintained contact with said inner wall; said cup being connected to be driven by said engine shaft for rotation of said cup in said predetermined direction upon rotation of said engine shaft and at an angular velocity determined by the angular velocity of said engine shaft; means for limiting the rate of rotation of said rod to a predetermined value; and means driven by rotation of said rod for indicating the duration of rotation of said rod.

References Cited

UNITED STATES PATENTS

| | | | |
|---|---|---|---|
| 335,285 | 2/1886 | Johnson | 64—30 |
| 1,022,801 | 4/1912 | Shipman | 235—104 |
| 1,077,611 | 11/1913 | Korte | 235—104 |
| 1,178,791 | 4/1916 | Fitzpatrick | 235—104 |
| 1,171,533 | 2/1916 | O'Keenan | 64—3 |
| 1,251,859 | 1/1918 | Bruhn | 235—104 |
| 1,468,322 | 10/1923 | Odom | 64—3 |
| 1,978,605 | 10/1934 | Showazter et al. | 235—104 |
| 2,160,813 | 6/1939 | Andrews | 235—104 |
| 2,439,980 | 4/1948 | Livermont | 64—3 |
| 2,601,911 | 7/1952 | Takats | 64—3 |
| 2,932,154 | 4/1960 | Rove et al. | 58—146 |

RICHARD B. WILKINSON, *Primary Examiner.*

S. A. WAL, *Assistant Examiner.*